(12) United States Patent
Mans et al.

(10) Patent No.: US 10,228,570 B2
(45) Date of Patent: Mar. 12, 2019

(54) FOCAL ATTENTIONAL REGION DISPLAYING A VIRTUALIZED THREE DIMENSIONAL OBJECT PROJECTED BY A MULTIPLE LAYERED DISPLAY SYSTEM

(71) Applicant: Pure Depth Limited, Auckland (NZ)

(72) Inventors: Richard Mans, Ngaruawahia (NZ); James Emslie, Auckland (NZ)

(73) Assignee: PURE DEPTH LIMITED (NZ)

( * ) Notice: Subject to any disclaimer, the term of this patent is extended or adjusted under 35 U.S.C. 154(b) by 0 days.

(21) Appl. No.: 14/986,158

(22) Filed: Dec. 31, 2015

(65) Prior Publication Data

US 2016/0187666 A1   Jun. 30, 2016

Related U.S. Application Data

(60) Provisional application No. 62/099,051, filed on Dec. 31, 2014.

(51) Int. Cl.
*G02B 27/14* (2006.01)
*G02B 27/22* (2018.01)
*G02B 27/01* (2006.01)

(52) U.S. Cl.
CPC ....... *G02B 27/2278* (2013.01); *G02B 27/017* (2013.01); *G02B 27/0172* (2013.01);
(Continued)

(58) Field of Classification Search
CPC ............ G02B 27/2292; G02B 27/2278; G02B 27/01; G02B 27/0081
(Continued)

(56) References Cited

U.S. PATENT DOCUMENTS 4,670,744 A * 6/1987 Buzak ................ G02B 27/2264
345/6
5,184,234 A  2/1993 Mathewson
(Continued)

FOREIGN PATENT DOCUMENTS

JP   61-24714   2/1986
JP   62-29938   2/1987
(Continued)

OTHER PUBLICATIONS

Shao et al., "High Efficiency Dual Mode Head Up Display System for Vehicle Application", SID International Symposium, Digest of Technical Papers, vol. 44, No. 1, Jun. 1, 2013; pp. 559-562.

*Primary Examiner* — Audrey Y Chang
(74) *Attorney, Agent, or Firm* — Craig A. Baldwin

(57) ABSTRACT

A visual display device including a plurality of stacked display layers displaying a plurality of objects. A first reflective surface is positioned at an angle to the plurality of stacked display layers, and projects a first subset of objects in a first direction towards a viewer. The first subset of objects is projected as if originating from a first focal attentional region comprising a first plurality of object planes. A second reflective surface is positioned at the angle to the first plurality of stacked display layers. The first and second reflective surfaces are approximately parallel to each other. The second reflective surface projects a second subset of objects in the first direction towards the viewer. The second subset of objects is projected as if originating from a second focal attentional region comprising a second plurality of object planes.

13 Claims, 10 Drawing Sheets

(52) U.S. Cl.
CPC ............... *G02B 2027/0118* (2013.01); *G02B 2027/0134* (2013.01)

(58) Field of Classification Search
USPC ........ 359/630, 479; 353/98, 21, 30; 345/4, 5
See application file for complete search history.

(56) References Cited

U.S. PATENT DOCUMENTS

| | | | |
|---|---|---|---|
| 5,594,563 A | 1/1997 | Larson | |
| 5,745,197 A * | 4/1998 | Leung | G02B 27/2278 348/E13.02 |
| 7,806,533 B2 * | 10/2010 | Boute | G02B 27/2292 348/14.01 |
| 7,916,223 B2 | 3/2011 | Kitagawa et al. | |
| 8,441,733 B2 * | 5/2013 | Kessler | G02B 27/0081 359/630 |
| 9,188,779 B2 | 11/2015 | Sakai | |
| 2009/0051623 A1 * | 2/2009 | Paul | G06T 7/001 345/4 |
| 2010/0271459 A1 | 10/2010 | Kao et al. | |
| 2013/0108229 A1 * | 5/2013 | Starner | G02B 27/01 385/119 |
| 2014/0362448 A1 | 12/2014 | Yamada | |

FOREIGN PATENT DOCUMENTS

| | | |
|---|---|---|
| JP | 2000-115812 | 4/2000 |
| JP | 2000-333212 | 11/2000 |
| JP | 2003-237412 | 8/2003 |
| JP | 2003-237412 A | 8/2003 |
| JP | 2005-172969 | 6/2005 |
| JP | 2007-108274 | 4/2007 |
| JP | 2009-008722 | 1/2009 |
| JP | 2012-58689 | 3/2012 |
| JP | 2013-214008 | 10/2013 |
| KR | 10-2007-0103321 | 10/2007 |

* cited by examiner

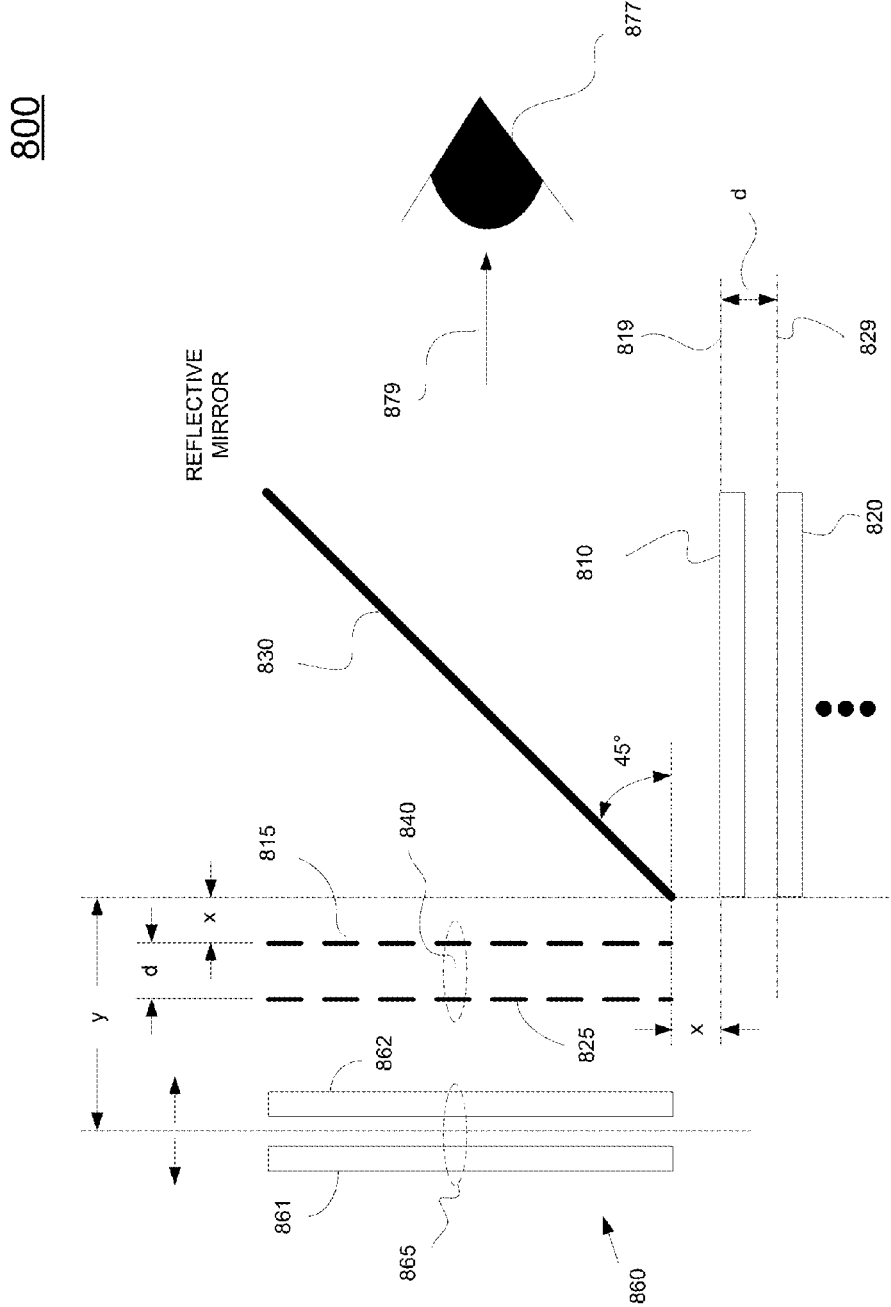

FOCAL ATTENTIONAL REGION DISPLAYING A VIRTUALIZED THREE DIMENSIONAL OBJECT PROJECTED BY A MULTIPLE LAYERED DISPLAY SYSTEM

CROSS REFERENCE TO RELATED APPLICATIONS

The present application claims priority to and the benefit of the commonly owned, provisional patent application, U.S. Ser. No. 62/099,051, entitled "A FOCAL ATTENTIONAL REGION DISPLAYING A VIRTUALIZED THREE DIMENSIONAL OBJECT PROJECTED BY A MULTIPLE LAYERED DISPLAY SYSTEM," with filing date Dec. 31, 2014, which is herein incorporated by reference in its entirety.

BACKGROUND

Artists are typically trained to think of figure and ground as separate layers. That is reality can be approximated as a series of separate layers. However, translating this technique to electronic display systems has been problematic. For example, stereoscopic displays try to break the entire volume into voxels, and suffer compromises because of over generalization. In another example, a lenticular system with polarized glasses generates only one view of an object, and suffers from motion parallax. In still another example, a system using both lenticular and stereoscopic approaches produces several views of an image, but at the expense of image resolution.

In another system, virtual objects can be displayed using display systems incorporating mirrors. For example, a heads-up-display (HUD) is configured to project images onto a passive screen. The screen can present data projected from an underlying display layer. As such, the user is also able to view past the screen to a background within the same line of sight. In that manner, the user is able to view the data displayed on the screen and a background image with the head of the user positioned normally. For example, a pilot can view data without looking down and taking eyes from the windscreen of the aircraft.

However, images projected by these traditional HUD displays inadequately exhibit three dimensional qualities. For example, the images displayed using a HUD do not have the illusion of continuous depth. That is, due to technical limitations, objects appear to be flat, with each object on a separate and distinguished viewing plane. As such, because the viewing planes are separated by large distances, no continuity can be achieved within a particular object.

What is desired is three dimensional display system that is able to provide objects and images having continuous depth.

BRIEF DESCRIPTION OF THE DRAWINGS

Further aspects of the present invention will become apparent from the following description which is given by way of example only and with reference to the accompanying drawings in which:

FIG. 8 is a diagram illustrating a display system configured to show two focal attentional regions produced from stacked display layers that are oriented at right angles to each other, wherein each focal attentional region includes at least two virtual or non-virtual layers displaying one or more objects projected from corresponding one or more display layers, in accordance with one embodiment of the present disclosure.

SUMMARY

Figure 1:
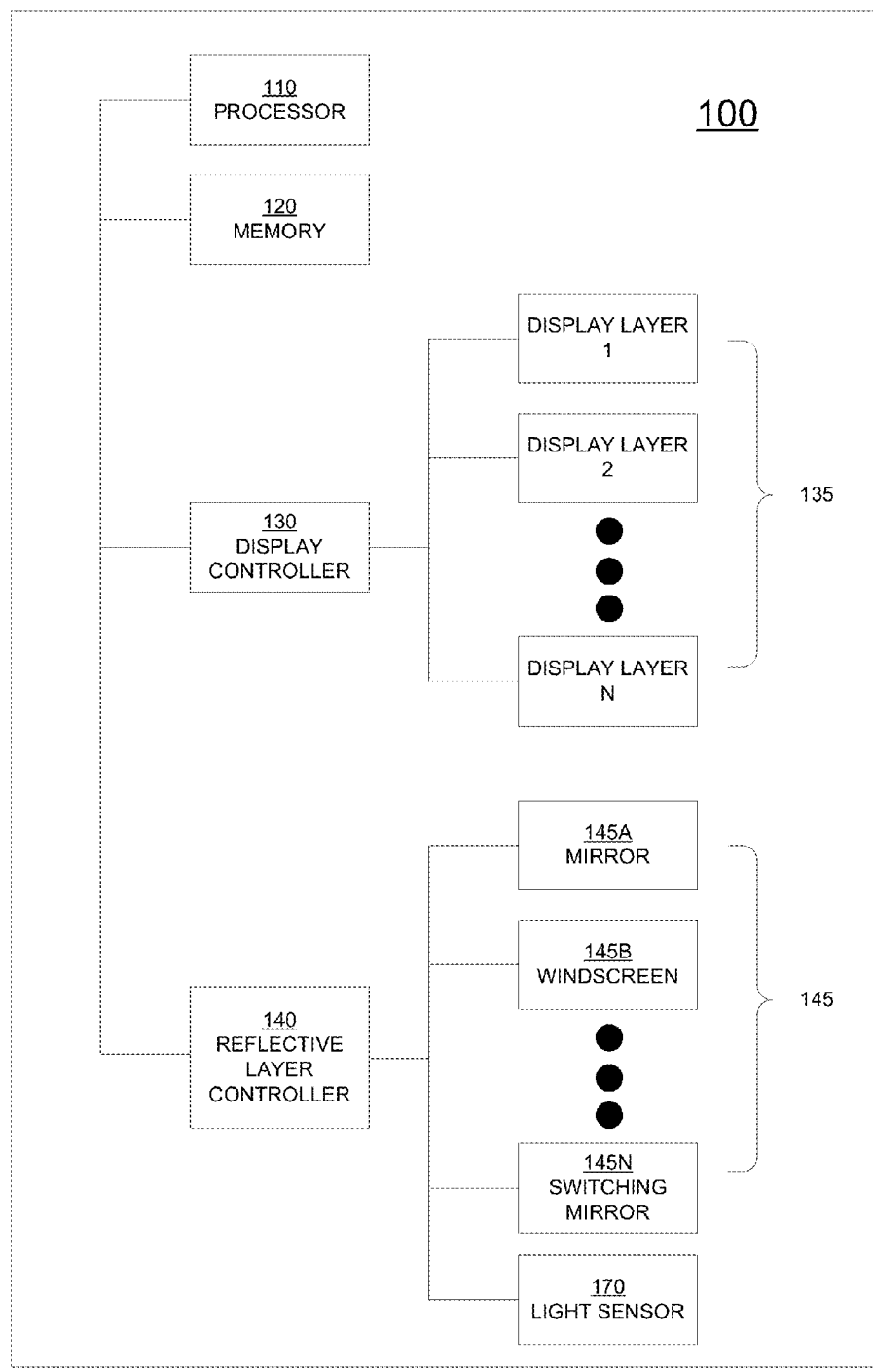
FIG. 1 is a block diagram of a display system showing virtualized three dimensional objects in a focal attentional region, in accordance with one embodiment of the present disclosure.

A visual display device is described in one embodiment and includes a first display in a first plane displaying a first image. The device includes a second display in a second plane displaying a second image. The first and second planes are approximately parallel to each other. The device includes a reflective surface, wherein the reflective surface is positioned at an angle to the first and second planes. The reflective surface projects the first image from a first object plane in a first direction towards a viewer. The reflective surface also projects the second image from a second object plane in the first direction. A focal attentional region comprises the first and second object planes.

In another embodiment, a visual display device is described, and includes a first plurality of stacked display layers, a first reflective surface, and a second reflective surface. The first plurality of stacked display layers is configured to display a plurality of objects. The first reflective surface is positioned at an angle to the first plurality of stacked display layers, and projects a first subset of objects in a first direction towards a viewer. Also, the first subset of objects is projected as if originating from a first focal attentional region comprising a first plurality of object planes that are associated with one or more display layers. The second reflective surface is positioned at the angle to the first plurality of stacked display layers. The first and second reflective surfaces are approximately parallel to each other. The second reflective surface projects a second subset of objects in the first direction towards the viewer. The second subset of objects is projected as if originating from a second focal attentional region comprising a second plurality of object planes associated with one or more display layers.

In another embodiment, a method for displaying is disclosed. The method includes displaying a first image on a first display located on a first plane. The method includes displaying a second image on a second display located in a second plane. The first and second planes are approximately parallel to each other. The method includes reflecting the first and second images off a reflective surface that is positioned at an angle to the first and second planes. The reflective surface is configured to project the first image from a first object plane in a first direction towards a viewer. The reflective surface is configured to project the second image from a second object plane in the first direction. A focal attentional region includes the first and second object planes.

These and other objects and advantages of the various embodiments of the present disclosure will be recognized by those of ordinary skill in the art after reading the following detailed description of the embodiments that are illustrated in the various drawing figures.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities, and refer to the action and processes of a computing system, or the like, including a processor configured to manipulate and transform data represented as physical (electronic) quantities within the computer system's registers and memories into other data similarly represented as physical quantities within the computer system memories or registers or other such information storage, transmission or display devices.

Flowcharts of examples of methods for display systems producing images in a focal attentional region are described, wherein the images are projected by a multiple layered display system, and wherein the images exhibit continuous depth when viewed, according to embodiments of the present invention. Although specific steps are disclosed in the flowcharts, such steps are exemplary. That is, embodiments of the present invention are well-suited to performing various other steps or variations of the steps recited in the flowcharts. Also, some embodiments described herein may be discussed in the general context of computer-executable instructions residing on some form of computer-readable storage medium, such as program modules, executed by one or more computers or other devices. By way of example, and not limitation, the software product may be stored in a nonvolatile or non-transitory computer-readable storage media that may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Accordingly, embodiments of the present invention provide for three dimensional systems that utilize empty space contained within images representing a scene that are combined with the composition of volumetric objects to create focal attentional regions that are separated in space.

FIG. 1 is a block diagram of a display system 100 capable of showing virtualized three dimensional objects in a focal attentional region, in accordance with one embodiment of the present disclosure. In particular, objects displayed in the focal attentional region exhibit continuous depth. In addition, there may be significant optical distance between two or more focal attentional regions having different and visually distinct focal depths to provide the impression of a separation of depth in space of one or more objects.

Display system may include a processor 110 and memory 120, wherein the processor 110 is configured to execute computer-executable instructions stored in the memory 120. Processor may be configured to show virtualized three dimensional objects in a focal attentional region that are displayed by one or more display layers. In one embodiment, the processor 110 is configured to perform the functions of one or more of the example embodiments described and/or illustrated herein. Further, the processor 110 may be included within a single or multi-processor computing device or system capable of executing computer-readable instructions. In its most basic form, a computing device may include at least one processor and a system memory. System memory is coupled to processor 110, and generally represents any type or form of volatile or non-volatile storage device or medium capable of storing data and/or other computer-readable instructions. Examples of system memory include, without limitation, random access memory (RAM), read only memory (ROM), Flash memory, or any other suitable memory device.

The display system 100 includes a display controller 130 that is configured to control the display of images across a plurality of display layers 130 (e.g., layers 1-N). One or more groups of display layers may be created, wherein each group of display layers are situated within a close depth proximity, thereby giving three dimensional objects generated by a corresponding group the illusion of continuous depth within a volume of space. As a result, the display controller 130 may receive instructions from processor 110 to display images throughout the plurality of display layers 130, such that an object displayed within a focal attentional group has continuous depth.

Additionally, the display layers may be oriented in one or more directions. In one embodiment, the display layers are oriented in a similar direction, such that images from one grouping of display layers are projected in a single direction. In another embodiment, different display layers or different groupings of display layers have different orientations, such that images from a first grouping of display layers are projected in a first direction, and images from a second grouping of display layers are projected in a second direction.

The display system includes a reflective layer controller 140 that is configured to control the operations of a plurality of reflective layers 145. For example, controller 140 is able to turn a reflective layer on or off. In addition, controller 140 is able to control the levels of transmittance, transparency, reflection, illumination, etc. exhibited by a reflective layer. Various combinations of reflective layers are supported in embodiments of the present invention. Some examples of reflective layers include, but are not limited to, a mirror 145A, a windscreen 145B, and a switching mirror. As previously described, each of the reflective layers may have one or more controllable features.

Figure 2:
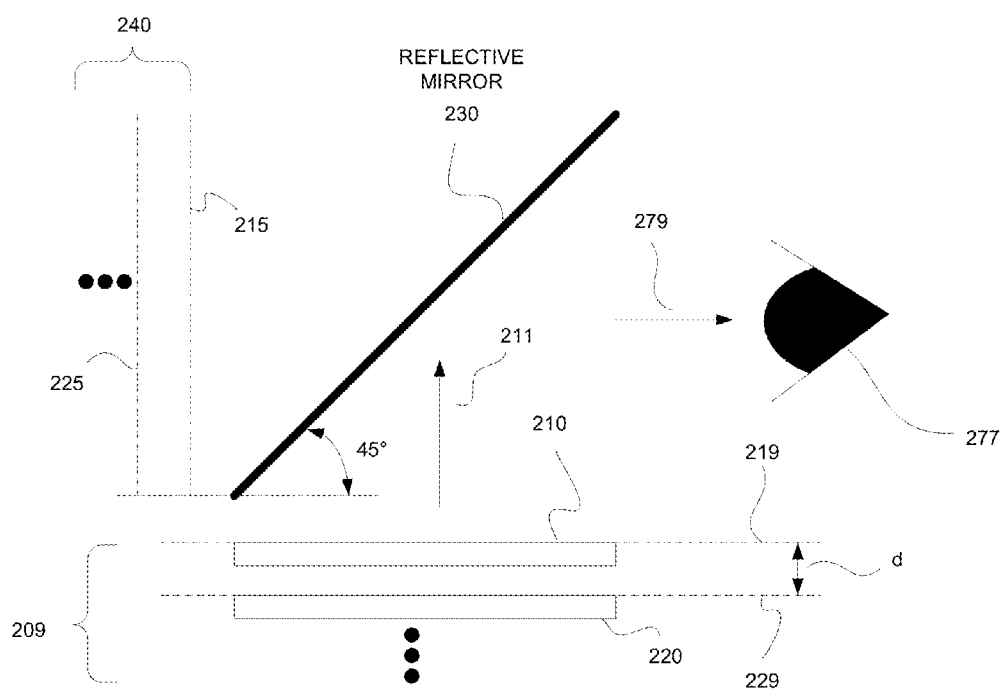
FIG. 2 is a diagram illustrating a display system configured to show a focal attentional region including at least two virtual layers displaying one or more objects projected from one or more display layers, in accordance with one embodiment of the present disclosure.

FIG. 2 is a diagram illustrating a display system 200 configured to show a focal attentional region including at least two virtual layers displaying one or more objects projected from one or more display layers, in accordance with one embodiment of the present disclosure. An object shown in the focal attentional region exhibits continuous depth. The display system 200 is also generally referenced as a visual display device.

As shown in FIG. 2, display system 200 includes first display layer 210, wherein the display layer 210 is configured to display a first image. In addition, the first display layer 210 is oriented in a first plane 219. For example, as shown in FIG. 2, display layer 210 may be oriented in a horizontal direction, perpendicular to gravity, such that the first image is projected in a vertical direction 211.

Display system 200 also includes a second display layer 220, wherein the display layer 220 is configured to display a second image. The second display layer 220 is oriented in a second plane 229, wherein the first and second planes are approximately parallel to each other.

More particularly, display system 200 includes a grouping of display layers 209, which includes one or more display layers (e.g., 1-N) that are stacked (e.g., in a multiple layered display), as shown in FIG. 2. For example, the grouping includes at least layer 210 and layer 220. The layers in the grouping are placed in close depth proximity with each other. For illustration, a two layer system that includes layer 210 and 220, a distance "d" between the layers defines a close depth proximity that is translatable and/or related to a focal attentional region. In another embodiment, each layer is separated by a distance "d" from another layer. For example, a close depth proximity may be defined by a distance "d" ranging from 5-15 mm, and in one specific embodiment a distance of 10 mm separates the display layers in a grouping. In that manner, a single grouping of closely spaced layers, placed in close depth proximity, is used for displaying content that gives the impression of related objects that are contiguous and continuous as projected and as viewed within a volume of space within system 200. As a result, a focal attentional region may span a distance that may be more than one distance d, depending on the number of display layers in a grouping.

A diffuser layer (not shown) may be located adjacent to the first display layer 210 or second display layer 220. For instance, in one implementation, the diffuser is located between the first display layer 210 and the second display layer 220.

For the sake of clarity and to aid understanding of the present invention, the display layers of system 200 and associated display screens 210 and 220, etc. (at least partially and selectively transparent) are shown in simplified, schematic form in the drawings, such that elements not essential to illustrate the present invention are omitted from the drawings to aid understanding. For example, the system 200 may include one or more of the following items: one or more polarizers associated with one or more display layers, refractor to increase viewing angles, a rear light source (e.g., polarized backlight source), light guide, mirrors, glass substrates, a diffuser to reduce moiré interference, etc. In one embodiment, the system 200 does not include a diffuser type element.

In one embodiment, a display layer is representative of any flat panel display technology. For example, in one embodiment a display layer may include a liquid crystal display (LCD) layers. However, it should be apparent to one skilled in the art that a number of alternative display technologies may be utilized in place of the LCD screens. For illustration, a display layer may include organic light emitting diodes (OLEDs), transparent OLEDs (TOLEDs), LCDs, reflective LCDs, reflective electrophoretic displays, vacuum fluorescent displays, and the like. In addition, the display layers may be monochrome, grey scale, full color, or any combination thereof.

System 200 includes a reflective surface 230, wherein the reflective surface is positioned at an angle to the first plane 219 and the second plane 229. For example, the reflective surface may be a mirror, a semi-transparent mirror (e.g., half silvered mirror), a partially reflective mirror, a vehicle (e.g., automobile, aircraft, boat, etc.) windscreen, a switchable mirror, etc. Further, operational characteristics of the reflective surface 230 may be controlled, as previously described. For instance, reflective surface 230 may be fully or partially transparent, in one implementation. In another implementation, reflective surface 230 may be fully or partially reflective. For example, the reflective surface 230 may be half silvered mirrors constructed from glass and sputtered with aluminum or any suitably reflecting metal. In embodiments, the metals may be deposited on a surface of the glass facing the viewer, or on the surface of the glass facing away from the viewer to form front or rear surface mirrors, respectively. In another embodiment, reflective surface 230 may be coated with at least one layer of anti-reflection coating to prevent unwanted secondary reflections.

In one embodiment, the angle for positioning the reflective surface 230 is approximately forty-five degrees. However, it is understood that the angle may be any angle suitable for projecting virtualized images and objects to a viewer from one or more focal attentional regions.

More particularly, the reflective surface 230 acts to project a virtualized first image from a first object plane 215 in the first direction 279 towards a viewer 277. That is, the reflective surface 230 reflects the first image projected by the first display layer 210 by approximately ninety degrees, such that the virtualized first image is directed to the viewer 277 along the first direction 279. Of course, the first image is also reversed by the reflective surface 230. In addition, the reflective surface acts to project a virtualized second image from a second object plane 225 in the first direction 279. That is the reflective surface 230 reflects the second image projected by the second display layer 220 by approximately ninety degrees, such that the virtualized second image is also directed along the direction 279 to the viewer 277. The reflective surface 230 also reverses the second image.

As a result, the virtualized first and second images appear to be projected from a focal attentional region 240 that comprises the first object plane 215, and the second object plane 225. That is, the reflective surface 230 projects objects in the first and second images as if they are originating from the focal attentional region 240. In that manner, a virtualized object projecting from the focal attentional region 240 appears continuous.

To illustrate continuity of an object within the focal attentional region 240, the first image from the first display 210 comprises a first plurality of objects. Also, the second image from the second display 220 comprises a second plurality of objects. A representative object may be shown as part of both the first and second images. When the objects in the two images are viewed together within the focal attentional region 240, the objects appear contiguous. As such, a representative object (including both contiguous objects) appears to be continuous through a volumetric space. As a result, focal attentional region 240 can, by itself, display a three dimensional object within a larger volume of space that may contain one or more focal attentional regions. A resulting scene appears to be more lifelike. In addition, the resulting scene has the practical benefit of filtering information by layers, thereby reducing the time required to find necessary information.

In one embodiment, the reflective surface 230 is partially transparent and/or partially reflective to provide a view to rear, which may be a view to reality (e.g., through a windscreen of a vehicle). A black background (not shown) is located at a distance behind the reflective surface 230. The black background is configured to increase contrast in the first and second images. The black background is located further from the viewer 277, such that the reflective surface 230 is between the black background the viewer 277.

In one embodiment, system 200 comprises a HUD system for a vehicle dashboard. In that case, display layer 210 and display layer 220 are placed horizontally on a dashboard of the vehicle. Light from both layers is reflected by a windscreen, which forms the partially reflective mirror 230. For example, the windscreen can be composed of glass, with a nominal four percent reflection.

Figure 3:
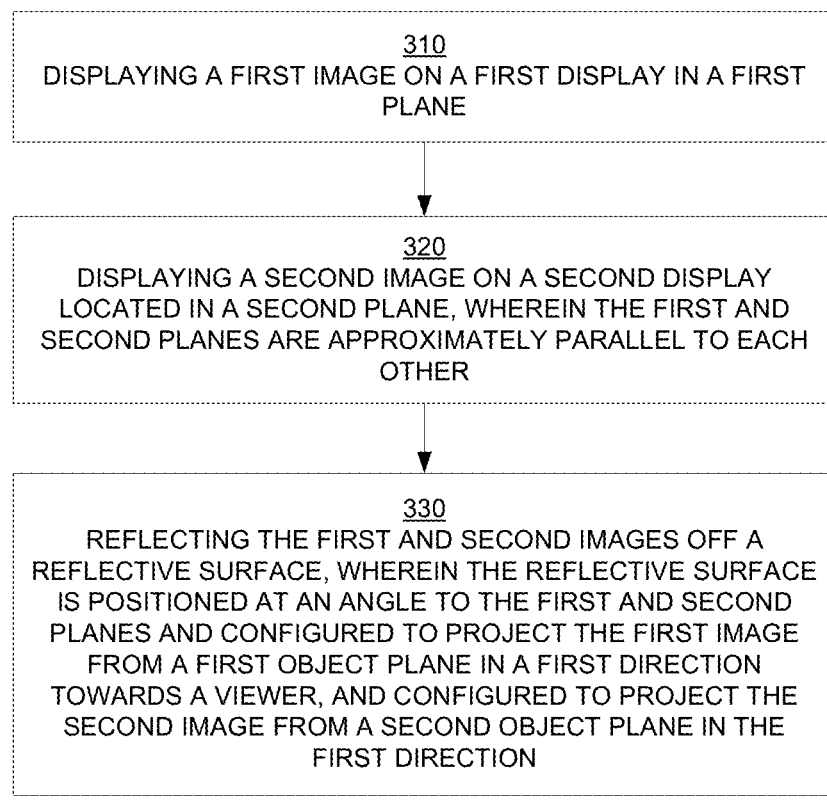
FIG. 3 is a flow diagram illustrating steps in a method for showing virtualized three dimensional objects in a focal attentional region as projected by a multiple layered display, in accordance with one embodiment of the present disclosure.

FIG. 3 is a flow diagram 300 illustrating steps in a method for showing virtualized three dimensional objects in a focal attentional region as projected by a multiple layered display, in accordance with one embodiment of the present disclosure. The operations of flow diagram 300 are implemented within the display systems 100 and 200 of FIGS. 1 and 2, in some embodiments. For example, flow diagram 300 is implemented by one or more components of display system 100, in one implementation, and by one or more components of display system 200, in another implementation.

In some embodiments, flow diagram 300 illustrates a computer implemented method showing virtualized three dimensional objects in a focal attentional region as projected by a multiple layered display. In another embodiment, flow diagram 300 is implemented within a computer system including a processor and memory coupled to the processor and having stored therein instructions that, if executed by the computer system causes the system to execute a method showing virtualized three dimensional objects in a focal attentional region as projected by a multiple layered display.

In still another embodiment, instructions for performing the method are stored on a non-transitory computer-readable storage medium having computer-executable instructions for causing a computer system to perform a method showing virtualized three dimensional objects in a focal attentional region as projected by a multiple layered display.

At 310, the method includes displaying a first image on a first display layer located in a first plane. For example, the display layer may be oriented in a horizontal direction, such that it is projecting light and images in a vertical direction. The display layer may be integrated into a vehicle dashboard.

At 320, the method includes displaying a second image on a second display layer located in a second plane. The first and second planes are approximately parallel to each other. Moreover, the first and second display layers are included in a grouping of display layers, wherein the layers in the grouping are placed in close depth proximity with each other, as previously described. In that manner, layers placed in close depth proximity allow for the projection of a three dimensional object (e.g., through one or more related objects in one or more layers) within a volume of space.

At 330, the method includes reflecting the first and second images off a reflective surface. The reflective surface is positioned at an angle to the first and second planes. For example, the angle may be forty-five degrees. The reflective surface is configured to project a virtualized first image from a first object plane in a first direction towards a viewer. The reflective surface is also configured to project a virtualized second image from a second object plane in the first direction.

The method includes placing the first display at a distance from the second display to project objects in the first and second images as if originating from the focal attentional region. The distance defines a close depth proximity for the focal attentional region. In particular, the focal attentional region includes the first and second object planes, and as a result, the virtualized first and second images appear to be projecting from the focal attentional region. To the viewer, the focal attentional region is further behind the reflective surface, at a distance that is a function of the placement of the reflective surface in relation to the first and second display layers. As such, a virtualized object projecting from the focal attentional region appears continuous.

Figure 4A:
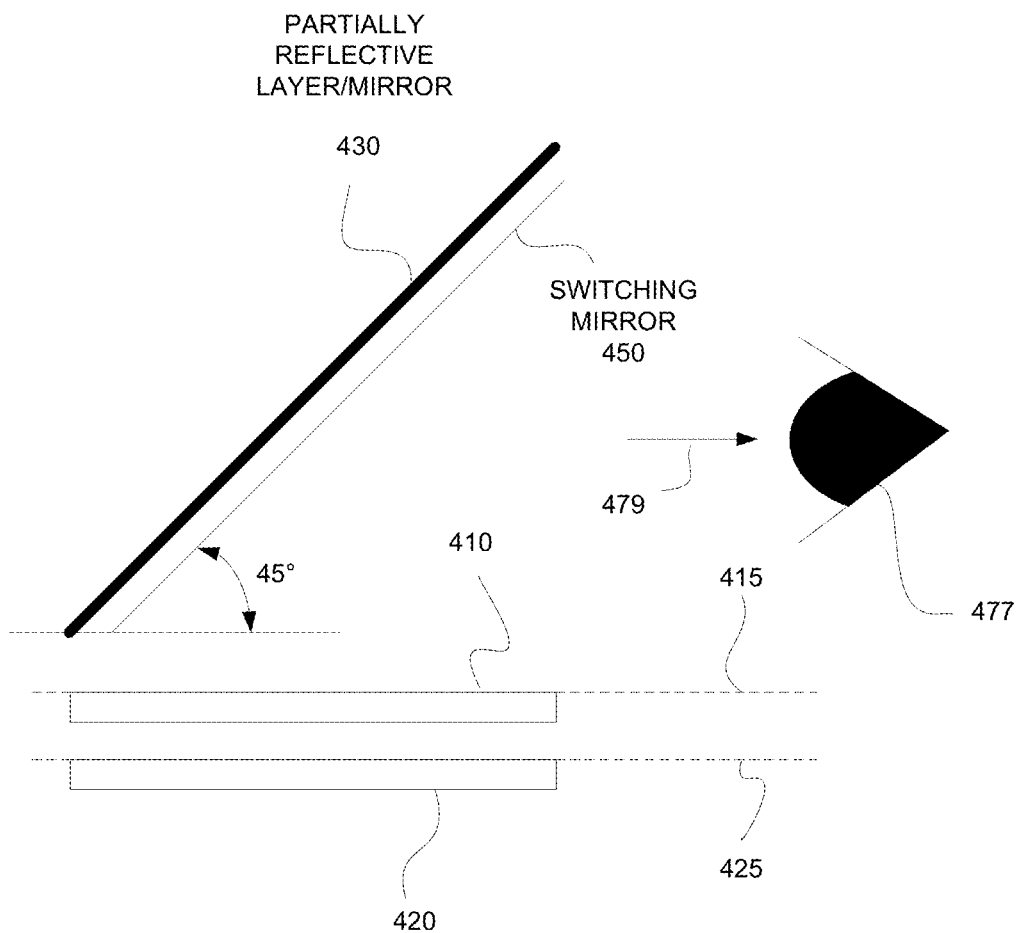
FIG. 4A is a diagram illustrating a display system configured to show a focal attentional region displaying one or more objects projected from one or more display layers, wherein the display system includes a switching mirror configured to control luminance of objects projected through the focal attentional region, in accordance with one embodiment of the present disclosure.

FIG. 4A is a diagram illustrating a display system 400A configured to show a focal attentional region displaying one or more objects projected from one or more display layers, wherein the display system includes a switching mirror 450 configured to control luminance of objects projected through the focal attentional region, in accordance with one embodiment of the present disclosure.

Display system 400A includes a first display layer 410 that is configured to display a first image. The first display layer 410 is oriented in a first plane 415. Display system 400A also includes a second display layer 420 that is configured to display a second image. The second display layer 420 is oriented in a second plane 125. The first plane 415 and the second plane 425 are approximately parallel to each other. The first display layer 110 and the second display layer 420 are placed in close depth proximity with each other. Layers placed in close depth proximity allow for the projection of a three dimensional object (e.g., through one or more related objects in one or more layers) within a volume of space.

System 400A includes a partially reflective layer 430 that is positioned at an angle to the first plane 415 and the second plane 425. For example, the partially reflective layer 430 can be a windscreen of an automobile, and its properties are static (e.g., approximately 4% reflective). In one embodiment, the display layers consist of adjacent and horizontally stacked layers. As such, the system 400A may include adjacent, horizontally stacked layers that are combined with the partially reflective layer 430 arranged at an angle to provide separate object planes. For example, the horizontally stacked layers may be placed beneath an automobile windscreen to provide a heads up display.

Additionally, a switching mirror 450 is positioned adjacent to the partially reflective layer 430. Each of the partially reflective layer 430 and the switching mirror 450 can include a controllable reflective surface, configured to provide degrees of reflection and/or transparency. In that case, depth and luminance of the first image, the second image, and a real world exterior image can be balanced by controlling the switching mirror 450 and/or the partially reflective mirror 430. In one embodiment, partially reflective mirror 430 comprises a switching mirror.

The partially reflective layer 430 and the switching mirror 150 act to project a virtualized first image originating from the first display layer 410 from a first object plane (not shown) in a first direction 479 towards a viewer 277. The partially reflective layer 130 in combination with the switching mirror act to project a virtualized second image originating from the second display layer 420 from a second object plane (not shown) in the first direction 479.

As an illustration, one part of a duty cycle has display layer 410 and the partially reflective layer 430 active. However, the switching mirror 450 and second display layer 420 are deactivated (e.g., transparent). In that case, the first image is reflected towards the viewer 477 using the reflective mirror 430. In another part of the duty cycle, the display layer 420 and the switching mirror 450 are active. The first display layer 410 and the partially reflective layer 430 are deactivated (e.g., transparent). In that case, the second image is reflected towards the viewer 477 using the switching mirror 450. A third part of the duty cycle has both display layer 410 and display layer 420 inactive, and the switching mirror 450 inactive (transparent) and the partially reflective mirror 430 inactive (transparent). In that case, the viewer 477 is able to view an exterior world scene located behind the mirrors 430 and 450.

In another example, switching mirror 450 is active in the first part of a duty cycle. Images from display layers 410 and 420, taken alone or in combination, may also be shown. That is, the switching mirror 450 is active in cases where images from display layers 410 and 420 are showing. Also, the switching mirror 450 only becomes inactive (e.g., transparent) when the display layers 410 and 420 are turned off, so that an image (e.g., real world view) from behind the reflective mirror 430 and switching mirror 450 can be viewed. In that case, both the reflective mirror 430 and switching mirror 450 are inactive, or partially reflective.

In a real world example, the partially reflective layer 430 is a windscreen of an automobile, and its properties are static (e.g., approximately 4% reflective). Environmental conditions will affect the ability of the partially reflective layer 430 to reflect the images from display layer 410 and/or display layer 420. For instance, during the day there is competing light or luminance from the exterior environment (e.g., sunlight) which will adversely affect the ability of the partially reflective layer 430 to reflect the images from display layer 410 and/or display layer 420. That is, the windscreen is a poor reflector during the day. In that case, the switching mirror 450 is turned on to prevent light from the exterior environment from adversely affecting the images projected from display layer 410 and/or display layer 420. Since the switching mirror is opaque, no light from the exterior environment will penetrate through to the viewer. In that case, instead of the images being poorly reflected by the partially reflective layer 430, the images from display layer 410 and/or display layer 420 are reflected by the switching mirror 450.

Figure 4B:
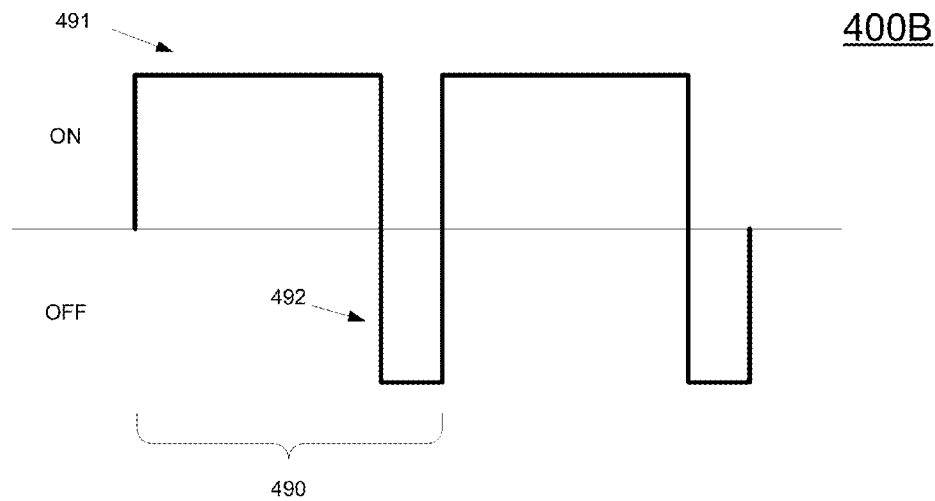
FIG. 4B shows a duty cycle of the switching mirror of FIG. 4A during the day, in accordance with one embodiment of the present disclosure.

Further, the relative signal strength between the images may be balanced through pulse width modulation (PWM) using the switching mirror 450. For example, the switching mirror 450 may be modulated by turning it on and/or off to reflect the images projected from display layer 410 and/or display layer 420 in a consistent duty cycle pattern. FIG. 4B shows a duty cycle 400B of the switching mirror 450 during the day used in the example provided above, in accordance with one embodiment of the present disclosure. As shown, over a period 490 of the duty cycle 400B the partially reflective layer 430 is turned on approximately 70-80% of the time. As such, the duty cycle of the switching mirror 450 is approximately 70-80 percent. In embodiments, the images of display layer 410 and display 420 may be turned on or off in various combinations over different periods to be reflected by switching mirror 450. For example, in one implementation display layer 410 is on and display layer 420 is off; in another implementation display layer 410 is off and display layer 420 is on; in one implementation both display layers 410 and 420 are off; and in another implementation both display layers 410 and 420 are on. Further, the images of display layer 410 and 420 may also be turned on or off in various combinations to be reflected by partially reflective layer 430, when the switching mirror 450 is off.

Figure 4C:
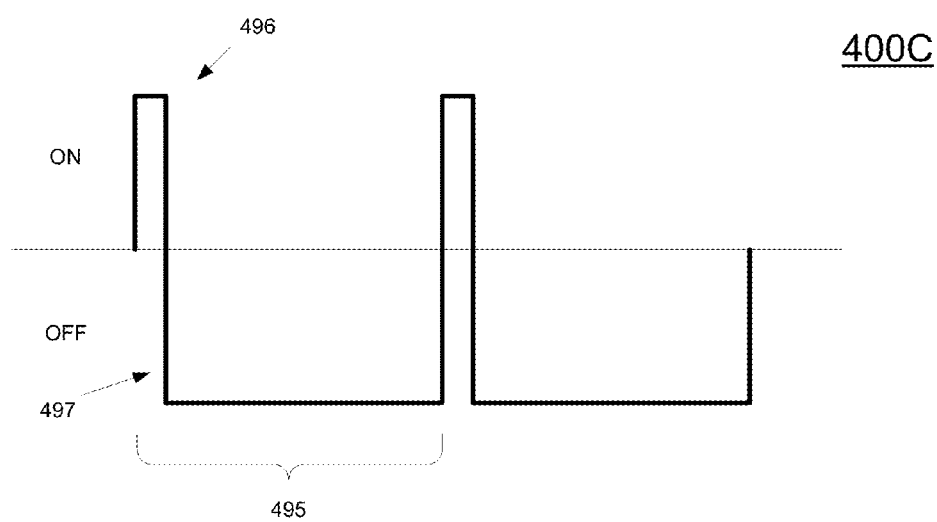
FIG. 4C shows a duty cycle of the switching mirror of FIG. 4A during the night, in accordance with one embodiment of the present disclosure.

FIG. 4C shows a duty cycle 400C of the switching mirror 450 during the night, in accordance with one embodiment of the present disclosure. At night, the partially reflective layer 420 effectively reflects the images from display layers 410 and/or 420 because there is limited competing light or luminance from the environment. As such, the switching mirror may be completely turned off, or may be turned on for a short period in the duty cycle to enhance the viewability of the images from display layers 410 and/or 420. As shown, over a period 495 of the duty cycle 400C the partially reflective layer 430 is turned on approximately 10% of the time. As such, the duty cycle of the switching mirror 450 is approximately 10 percent. In embodiments, the images of display layer 410 and display 420 may be turned on or off in various combinations over different periods to be reflected by partially reflective layer 430. For example, in one implementation display layer 410 is on and display layer 420 is off; in another implementation display layer 410 is off and display layer 420 is on; in one implementation both display layers 410 and 420 are off; and in another implementation both display layers 410 and 420 are on. Further, the images of display layer 410 and 420 may also be turned on or off in various combinations to be reflected by switching mirror 450 to enhance the images being reflected off of the partially reflective layer 430. Further, the images may be controlled depending on various conditions experienced by the user (e.g., environment, traffic, noise, etc.).

In one embodiment, the duty cycle may be changed throughout the day and night depending on environmental conditions. For example, the light sensor 170 of FIG. 1 is able to determine how much competing light or luminance is present from the environment. As noon approaches, the duty cycle may be increased to compensate for increasing amounts of sunlight. As night approaches, the duty cycle may be decreased due to decreasing amounts of competing sunlight. Also, when stormy conditions exist, the duty cycle may be decreased as there is less competing light. Further, at times when the sunlight is directly coming from the direction the user is traveling, the duty cycle may be increased due to direct sunlight and/or glare.

Further, depth and luminance of the first image and the second image are balanced by controlling in combination the switching mirror 450 and the reflective surface 430. For example, the reflective surface 430 and the switching mirror 450 may be alternatively turned on or off to provide less luminance to the one or more of the images, or combined to provide more luminance. In still another embodiment, depth and luminance of the first image and the second image, as well as an exterior image located to the rear of the reflective surface 430 (e.g., further away from viewer 477) are balanced by controlling in combination the switching mirror 450 and the reflective surface.

Figure 5:
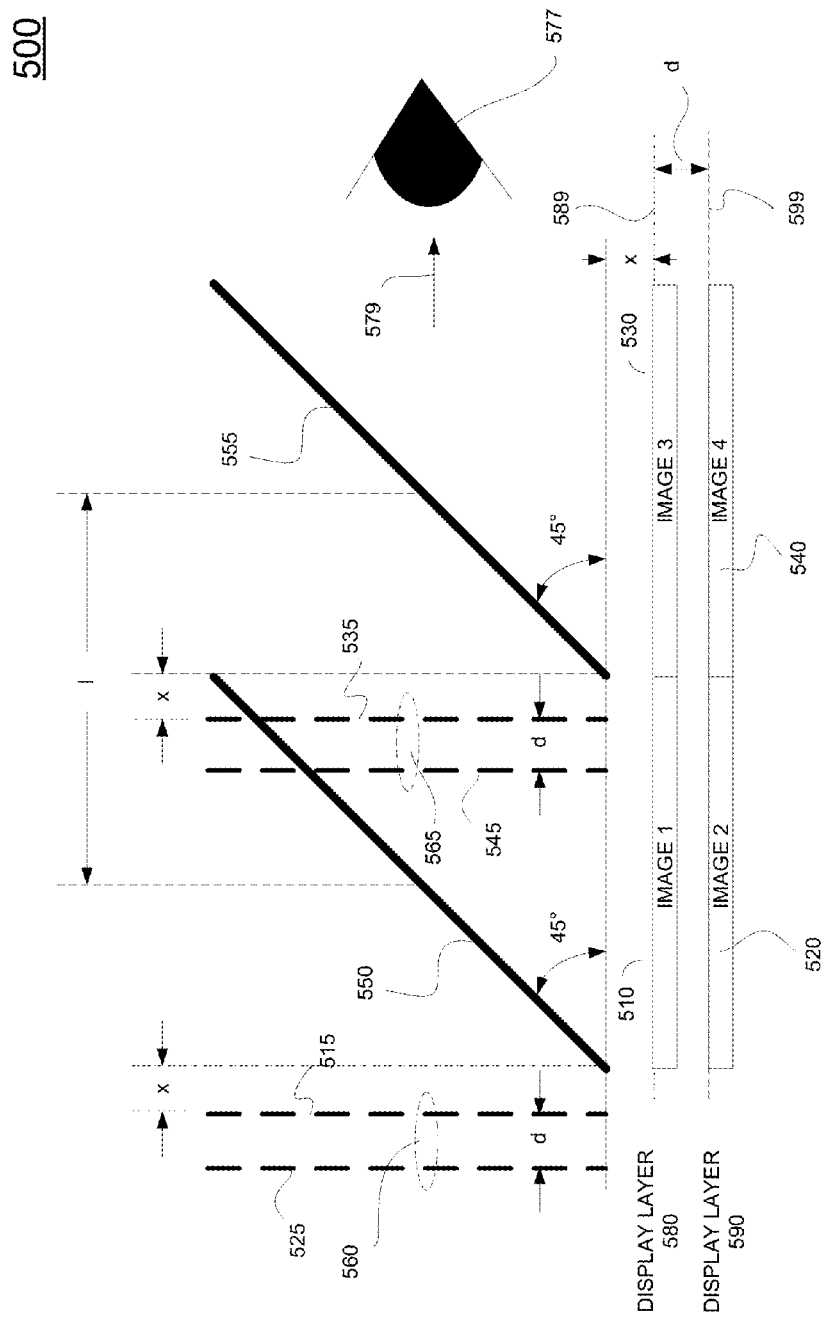
FIG. 5 is a diagram illustrating a display system configured to show two focal attentional regions, wherein each region includes at least two virtual layers displaying one or more object projected from one or more display layers, in accordance with one embodiment of the present disclosure.

FIG. 5 is a diagram illustrating a display system 500 configured to show two focal attentional regions, wherein each region includes at least two virtual layers displaying one or more object projected from one or more display layers, in accordance with one embodiment of the present disclosure. An object found in any of the focal attentional regions can exhibit continuous depth.

As shown in FIG. 5, two display layers 580 and 590 are stacked horizontally with some distance "d" between them. The display layers may be stacked in other orientations, depending on the viewpoint of the user. This distance is within a close depth proximity. Also two half silvered mirrors 550 and 555 are placed at approximately forty-five degrees above the display layers 580 and 590. A viewer 577 looks at the view reflected by mirror 555, which is partially transparent, to see images 3 and 4. The images may include shading effects to promote the illusion that related objects contained within images 3 and 4 appear as one continuous object having depth. The viewer 577 may look through mirror 555 to mirror 550 which reflects images 1 and 2 to display another image or scene that contains another continuous object having depth.

Display layers 580 and 590 may contain pixels to provide complete flexibility with regard to content displayed. In one implementation, the display layers 580 and 590 may contain pixels fixed regions formed from indium tin oxide (ITO), and the like to reduce addressing complexity.

Reflective surfaces 550 and 555 (e.g., mirrors) are separated by a larger distance "l" than that separating display layers, for example. As an illustration, reflective surfaces 550 and 555 are separated by 100 mm, or a distance within a range between 50 to 150 mm. Reflective surfaces 550 and 55 act to generate different focal attentional regions. For example, a first focal attentional region 565 is separated by a significant optical distance (e.g., having different and distinct focal depths to a viewer 577) from a second focal attentional region 560. That is, the distance is large enough to provide distinct focal attentional regions to a viewer. Specifically, this separation gives the impression of depth in space between objects shown in a first attentional region and other objects shown in a second attentional region.

In particular, display system 500 includes a first plurality of stacked display layers displaying a plurality of objects. Each of the display layers is configured to display at least one image, wherein the images combined form a scene. For example, a first display layer 580 includes a first part 510, and a second part 530. The first part 510 displays image 1, wherein the second part 530 displays image 3. The first display layer is closer to the mirrors 550 and 55 than the second display layer 590. Also, second display layer 590 includes a first part 520 and a second part 540. The first part 520 displays image 2, wherein the second part 540 displays image 4.

The first and second display layers 580 and 590 are separated by a distance "d", and are in close depth proximity to each other. As a result, a corresponding focal attentional region 565 also spans a distance "d", and corresponding focal attentional region 560 also spans a distance "d." In that manner, at one time, objects shown in focal attentional region 565 are within focus to viewer 577, and objects shown in focal attentional region 560 are not in focus. Similarly, at another time, objects shown in focal attentional region 560 are within focus to the viewer 577, while objects shown in focal attentional region 565 are not in focus.

The first reflective surface 555 is positioned at an angle (e.g., approximately forty-five degrees) to the plurality of stacked display layers. The first reflective surface 555 projects a first subset of virtualized objects in a first direction 579 to a viewer 577. Also, reflective surface 555 is controllably reflective, such that it may be partially transparent, or partially reflective. For instance, reflective surface 555 may be a mirror, a semi-transparent mirror, a partially reflective mirror, etc.

In particular, reflective surface 555 projects the first subset of virtualized objects as if originating from a first focal attentional region 565. Specifically, reflective surface 555 acts to project a virtualized image 3 from object plane 535 in the first direction 579. Reflective surface 555 acts to project a virtualized image 4 from object plane 545 in the first direction 579. That is, image 3 and image 4 are aligned for projection from the reflective surface 555. The virtualized images 3 and 4 appear to originate from focal attentional region 565. As such, related objects contained within virtualized images 3 and 4 appear as one continuous object having depth. In addition, focal attentional region 565 is offset from mirror 555 by a distance x, which is related to the separation between display layer 580 and the bottom of mirror 555 or mirror 550.

The second reflective surface 550 is positioned at an angle (e.g., approximately forty-five degrees) to the plurality of stacked display layers. The first reflective surface 555 and the second reflective surface 550 are approximately parallel to each other. The second reflective surface 550 projects a second subset of virtualized objects in the first direction 579 to viewer 577. Also, reflective surface 550 is controllably reflective, such that it may be partially transparent, or partially reflective. For instance, reflective surface 550 may be a mirror, a semi-transparent mirror, a partially reflective mirror, a windscreen, etc.

In particular, the second reflective surface 550 projects the second subset of virtualized objects as if originating from the second focal attentional region 560. Specifically, reflective surface 550 acts to project a virtualized image 1 from object plane 515 in the first direction 579. Reflective surface 550 acts to project a virtualized image 2 from object plane 525 in the first direction 579. That is, image 1 and image 2 are aligned for projection from the reflective surface 550. The virtualized images 1 and 2 appear to originate from focal attentional region 560. As such, related objects contained within virtualized images 1 and 2 appear as one continuous object having depth. In addition, focal attentional region 560 is offset from mirror 550 by a distance x, which is related to the separation between display layer 580 and the bottom of mirror 555 or mirror 550.

In one embodiment, a black layer may be placed behind the reflective surfaces 550 and 555 in the line of view (e.g., direction 579) to improved the contrast of the display system 500. In another embodiment, the system 500 is enclosed in a black box to prevent the ingress of stray light. Also, an anti-reflective film or coating may be provided on one or more of the reflective surfaces 550 and 555.

In another embodiment, a switching mirror may be positioned adjacent to reflective surface 555. In that case, control over the switching mirror and/or a controllable reflective surface 555 balances luminance and depth of images 3 and 4. Also, a switching mirror may be positioned adjacent to reflective surface 550. In that case, control over the switching mirror and/or a controllable reflective surface 550 balances luminance and depth of images 1 and 2.

Figure 6:
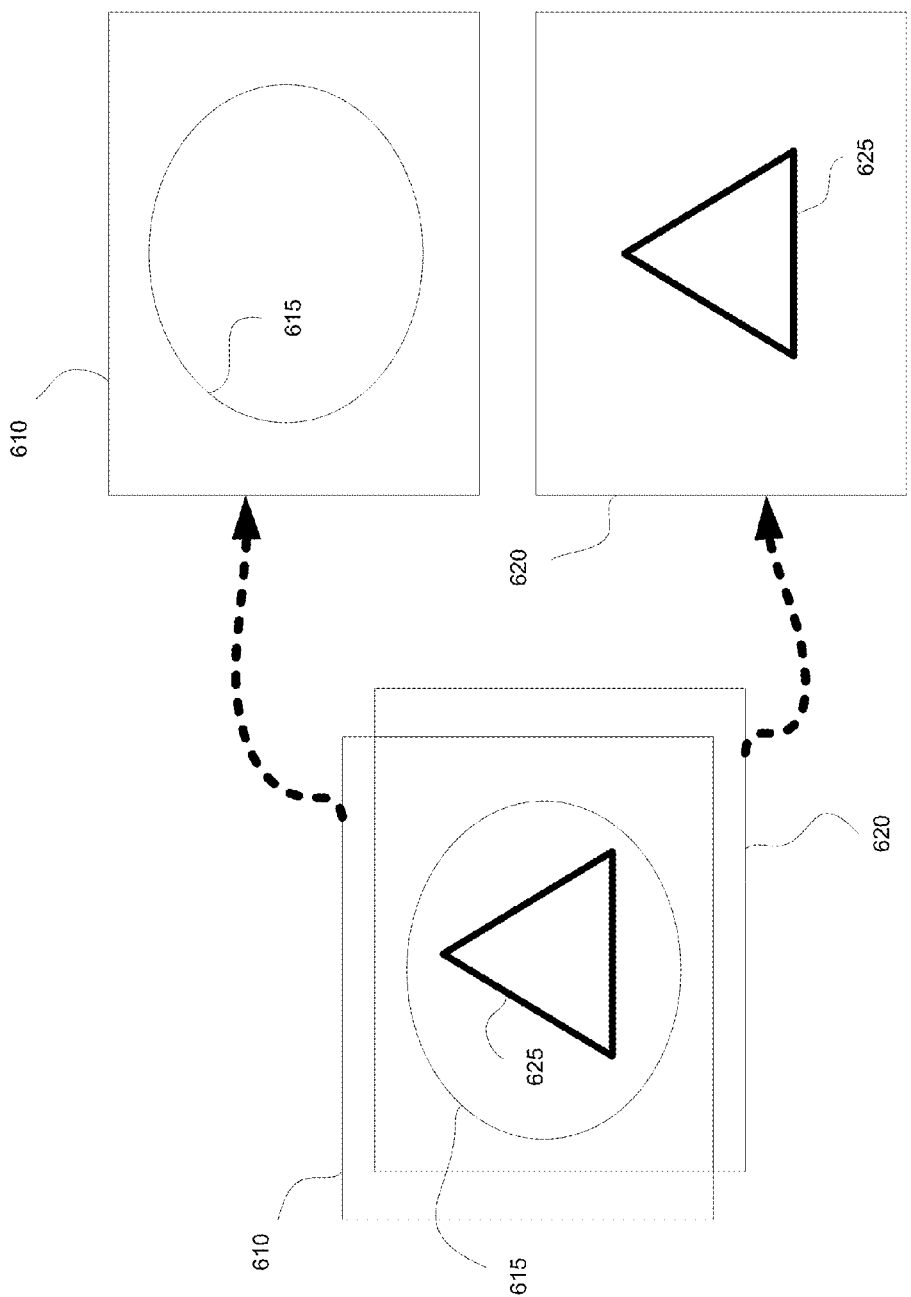
FIG. 6 is a diagram illustrating two display layers located within a close depth distance from each other, such that a display system projects one or more objects projected from the display layers in a focal attentional region, in accordance with one embodiment of the present disclosure.

FIG. 6 is a diagram illustrating two display layers located within a close depth proximity to each other, such that a display system projects one or more objects projected from the display layers in a focal attentional region, in accordance with one embodiment of the present disclosure. In particular, display layer 610 displaying image 615 is located behind display layer 620 displaying image 625. As shown in FIG. 6, image 615 is an oval providing an outline boundary for the triangle image 625. Because the display layers 610 and 620 are in close depth proximity, the resulting images 615 and 625 may have continuous depth. As such, if both images were similar and related (e.g., both a triangle), then a resulting three dimensional image of a triangle would appear to have continuous depth, and if shaded appropriately.

FIGS. 7A, 7B, 7C, and 7D are diagrams illustrating the various layers of a display system configured to show one or more focal attentional regions, wherein each focal attentional region includes at least two virtual layers displaying one or more objects projected from one or more display layers, in accordance with embodiments of the present disclosure.

Figure 7A:
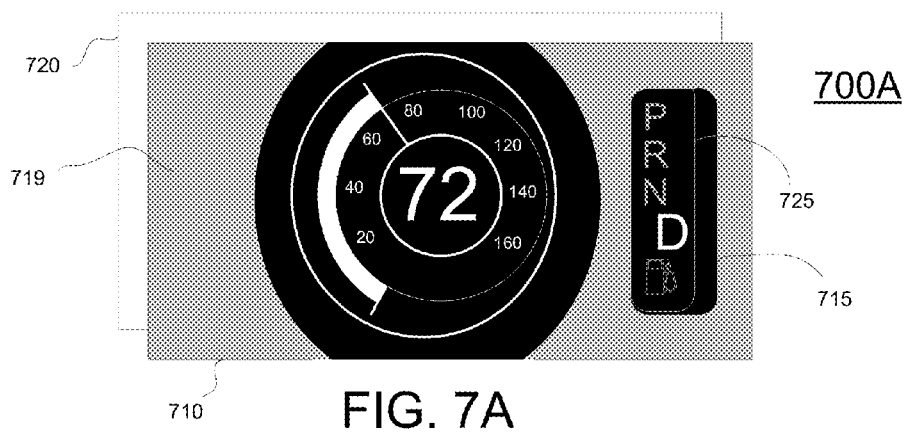
FIGS. 7A-D are diagrams illustrating the various layers of a display system configured to show one or more focal attentional regions, wherein each focal attentional region includes at least two virtual layers displaying one or more objects projected from one or more display layers, in accordance with embodiments of the present disclosure.

In particular, FIG. 7A is an illustration 700A of two virtualized display layers 710 and 720 that are located within a close depth proximity to each other. For example, the virtualized layers may be reflected by one or more physical, reflective surfaces. As shown, virtual display layer 710 is shown in front of the virtual display layer 720. For instance, virtual display layer 710 may be separated from virtual display layer 720 by 10 mm. The two display layers may be part of an instrument panel that includes various objects, including a speedometer, a gear indicator, and a fuel warning. The information shown in the virtual display layers 710 and 720 may be included within a first focal attentional region.

From the perspective of a viewer, various items appear closer due to the separation of the two virtual display layers. The images may be presented in front of a blacked background for greater contrast. The front virtual display layer 710 may include frosted regions 719 that are used to block out an unwanted images, and focus attention of the user to the speedometer and gearing information.

For example, the speedometer having the number "72" surrounded by the incremental number markings (e.g., 20, 40, 60, etc.) and a visual speed indicator 730 appear to be closer than the outline circle 750, which is not centered and showing parallax as viewed from a viewers perspective. Also, the letter "D" showing that the automobile is in a drive gear is closer than the other gear markings, such as "P" for park, "R" for reverse, "N" for neutral. An outline 725 of the gear markings as displayed by display layer 720 is also shown recessed from the "D" indicator in window 715 carved out of the frosted region 719 of the display layer 710. In that manner, "D" appears to pop out from the instrument panel, and appears to separated from the other gear P-R-N gear markings, which are also slightly deemphasized to bring attention to the "D" indicator.

Figure 7B:
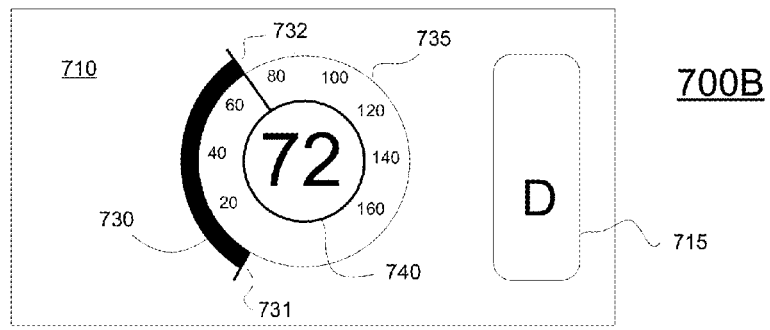

FIG. 7B is an illustration 700B of the front virtual display layer 710 in isolation. As shown, virtual layer 710 includes the full speedometer with a digitized number (e.g., 72) of the actual speed of the automobile. The digitized number is surrounded by outline 740. Also, between outlines 735 and 740, various incremental markings (e.g., 20, 40, 60, 80, 100, 120, 140, and 160) are provided showing possible readings of the speedometer. In addition, a visual speed indicator 730 (e.g., a solid bar) curves around outline 735 in bold between initial mark 731 and end mark 732 illustrating a measured representation of the digitized value "72." In that manner, the speed of the automobile may be determined using two different pieces of information.

In addition, front virtual display layer 710 also shows the drive "D" indicator in window 715. As shown, the letter "D" is bolded and pronounced. Similarly, the images for the digitized number "72", incremental speed marking, outlines 735 and 740, visual speed indicator 730 and marks 731 and 732 are bolded which help focus attention of the viewer to those pieces of information.

Figure 7C:
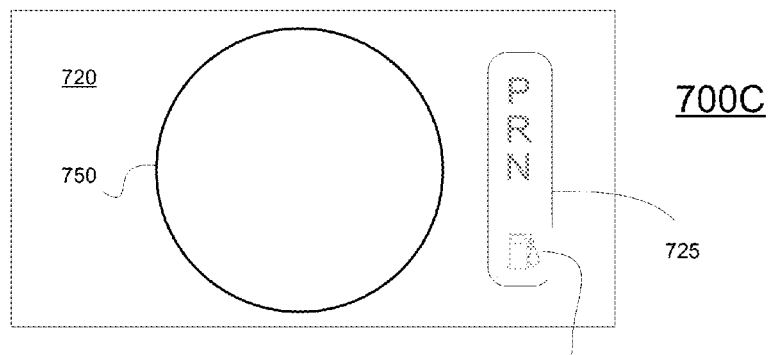

FIG. 7C is an illustration 700C of the rear virtual display layer 720 in isolation. As shown, virtual layer 720 includes the outline 750 that surrounds the speedometer shown in layer 710. The outline 750 in combination with the various images for the digitized number "72", incremental speed marking, outlines 735 and 740, visual speed indicator 730 and marks 731 and 732 help to create the appearance that the speedometer is three dimensional. Other objects shown in layer 720 also help to give the appearance of depth between virtualized objects shown in virtual layers 710 and 720.

Information provide in virtual layer 720 may be less important than the information provided in virtual layer 710. In addition, virtual layer 720 includes the outline 725 that surrounds the gear markings P-R-N, which are also deemphasized. A deemphasized "low gas" indicator 729 is also shown in virtual layer 720. These items of information are deemphasized to focus the attention of the viewer on the "D" drive indicator and the speedometer, both shown in layer virtual 710.

Figure 7D:
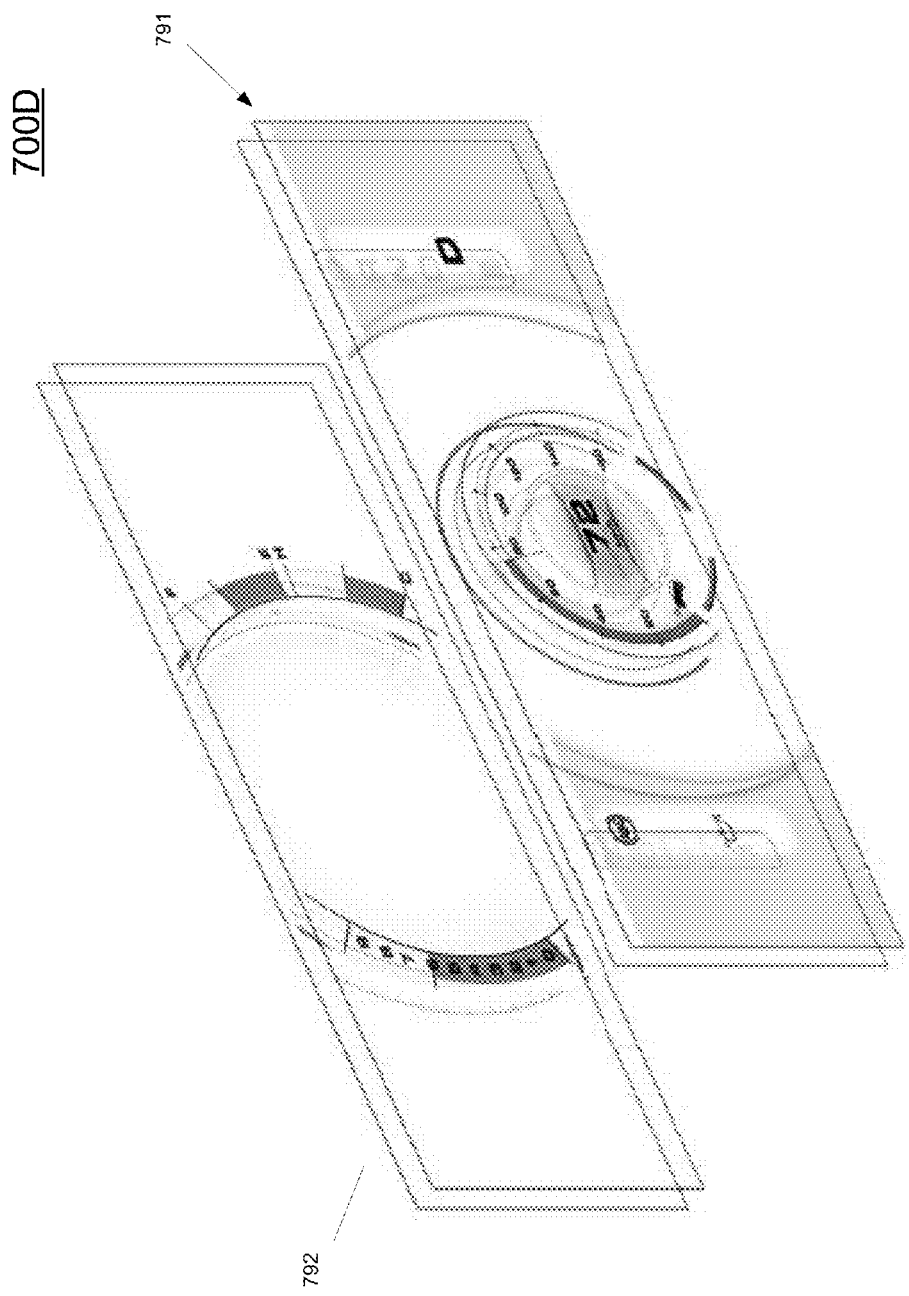

FIG. 7D is a perspective view of the instrument panel 700D shown in layered form in FIGS. 7A-C. More particularly, instrument panel 700D includes a first focal attentional region 791, including the speedometer and gear indicator, and a second focal attentional region 792, including a tachometer. The first focal attentional region 791 and the second attentional region 792 illustrate separate car dashboard depth regions. The different focal attentional regions are separated by a significant optical distance, to give the impression of a different object occupying a large volumetric space. The content on layers within the focal attentional regions relate to each other in a way that creates the illusion of a continuous three dimensional object exiting on and in between layers. Further, within each region, shading effects, or hardware, may be used to provide the illusion that the region and the objects shown in that region are contiguous, and/or continuous in depth. This illusion of a three dimensional object is further enhanced by having the first focal attentional region 791 free-standing in front of the second focal attentional region 792 with surrounding content that accentuates the empty three dimensional space behind the first focal attentional region 791.

For example, the first focal attentional region 791 illustrates an integrated object providing both a large angular depiction (e.g., 730) of speed, as well as a numerical indication (e.g., the number "72"). Also, as part of the same object, active warning indicators show a pronounced antibraking system (ABS) symbol, and low oil warning symbol on the left hand side, indicating these items may need attention. In addition, as part of the same object indicators on the right hand side of the instrument panel depict automatic gear selection "D", and a fuel warning (e.g., symbol 729). Important indicators may pop forward to the front of the first focal attentional region 791 to indicate one or more problems with the automotive system.

The second focal attentional region 792 shows an engine revolution counter, engine temperature indicator, and a fuel level indicator. The revolution dial indicators and numbers are layered over a graduated scale.

FIG. 8 is a diagram illustrating a display system 800 configured to show two stacked layers that are oriented at right angles to each other. The groupings of stacked layers each produce a corresponding focal attentional region, including at least two virtual or non-virtual layers displaying one or more objects projected from corresponding one or more display layers, in accordance with one embodiment of the present disclosure.

In particular, system 800 may include a first plurality of stacked layers at right angles to a second plurality of stacked layers. A half silvered mirror is placed approximately forty-five degrees to both pluralities of stacked layers. One of the plurality of stacked layers is variably offset from the mirror to achieve a desired offset between the focal attentional regions.

As shown in FIG. 8, the first plurality of stacked layers includes two display layers 810 and 820 that are stacked horizontally, with some distance "d" between them. The display layers may be oriented in another direction, depending on the viewpoint of the viewer 877. This distance "d" is within a close depth proximity. Each of the display layers 810 and 820 are capable of displaying images that combined form a scene. Further, within the images, the plurality of stacked layers displays a plurality of objects.

Also, a reflective surface 830 (e.g., mirror) is placed at approximately forty-five degrees to the display layers 810. The reflective surface 830 projects one or more virtualized objects in a first direction 879 towards a viewer 877. In particular, reflective surface 830 projects the objects and images from the display layers 810 and 820 as if they are originating from a first focal attentional region 840. The focal attentional region n840 is offset from the reflective surface 830 by a distance "x", which is the distance between the display layer 810 and the bottom of the reflective surface 830. Specifically reflective surface 830 acts to project a virtualized image originating from display layer 810 from the object plane 815 in the first direction 879. Also, reflective surface 830 acts to project a virtualized image originating from display layer 820 from the object plane 825 in the first direction 879.

System 800 includes a second plurality of stacked display layers 860 positioned behind the reflective surface 830. For example, the second plurality of stacked display layers 860 includes display layers 861 and 862, which project images in the first direction 879. The display layers 861 and 862 may be separated by a distance "d" to exhibit close depth proximity. In that manner, display layers 861 and 862 may display images and objects within a second focal attentional region 865.

As shown in FIG. 8, the offset "y" of the second plurality of stacked display layers 860 may vary. That is, the second plurality of stacked display layer 860 may shift left or right depending on the desired interaction between the images in focal attentional regions 840 and 865. In one embodiment, the focal attentional region 865 is closer to the viewer 877 than the focal attentional region 840. In another embodiment, the focal attentional region 865 is further away from the viewer than the focal attentional region 840. In both of these cases, the images from the second plurality of stacked display layers 860 do not interfere with the first focal attentional region 840. In still another embodiment, the focal attentional region 865 is approximately the same distance from the viewer 877 as the focal attentional region 840. That is, both focal attentional regions occupy approximately the same physical space, such that images from the second plurality of stacked display layers 860 interferes with the focal attentional region 840.

Thus, according to embodiments of the present disclosure, systems and methods are described providing for the display of an object having continuous depth in a focal attentional region.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments.

The invention claimed is:

1. A visual display device, comprising:
   a first display in a first plane, wherein said first display is configured to display a first image;
   a second display in a second plane, wherein said second display is configured to display a second image, wherein said first and second planes are approximately parallel to each other; and
   a partially reflective surface of a vehicle windshield, and a switching mirror, that are substantially parallel to each other, wherein said partially reflective surface is positioned at an angle to said first and second planes, wherein said partially reflective surface is configured to project said first image from a first object plane in a first direction towards a viewer, and to project said second image from a second object plane in said first direction,
   wherein the partially reflective surface of the vehicle windshield has static or dynamic reflective properties, and the switching mirror has dynamic and selectable reflective properties,
   wherein in a first mode, the display device is configured to reflect the first image toward a viewer via the partially reflective surface when the switching mirror and the second display are deactivated, and
   wherein in a second mode, the display device is configured to reflect the second image toward a viewer via the switching mirror when the switching mirror and the second display are activated, and the first display is deactivated,
   wherein the first and second modes are selectively activatable based on ambient light conditions so as to be able to switch back and forth between the first and second modes based on ambient light conditions.

2. The visual display device of claim 1, wherein said angle for positioning said reflective surface is approximately forty-five degrees relative to the first and second displays.

3. The visual display device of claim 1, wherein said first display and said second display are part of a multi-layered display (MLD).

4. The visual display device of claim 3, wherein said MLD is configured to be positioned horizontally and perpendicularly to gravity.

5. The visual display device of claim 1, wherein said reflective surface comprises a partially transparent surface.

6. The visual display device of claim 5, wherein said reflective surface forms a display for a heads up display (HUD).

7. The visual display device of claim 5, wherein said partially transparent surface comprises a vehicle windshield.

8. The visual display device of claim 1, wherein depth and luminance of at least one of said first image and said second image are balanced by controlling said switching mirror.

9. The visual display device of claim 8, wherein said reflective surface comprises a controllable reflective surface that is configured to provide degrees of reflection; and wherein depth and luminance of at least one of said first and second images and a real world image located external to said reflective surface are balanced by controlling said switching mirror in combination with said controllable reflective surface.

10. The visual display device of claim 1, further comprising: a black background located at a distance behind said reflective surface configured to increase contrast of objects in said first and second images.

11. The visual display device of claim 1, further comprising: a diffuser located adjacent to said first or second display.

12. The visual display device of claim 11, wherein said diffuser is located between said first and second displays.

13. A method for a visual display system, the method comprising:
   having a first display in a first plane, wherein said first display displays a first image;
   having a second display in a second plane, wherein said second display displays a second image, wherein said first and second planes are approximately parallel to each other; and
   having a partially reflective surface of a vehicle windshield, and a switching mirror, that are substantially parallel to each other, wherein said partially reflective surface is positioned at an angle to said first and second planes, wherein said partially reflective surface projects said first image from a first object plane in a first direction towards a viewer, and projects said second image from a second object plane in said first direction,
   wherein the partially reflective surface of the vehicle windshield has static reflective properties, and the switching mirror has dynamic and selectable reflective properties,
   in a first mode, reflecting the first image toward a viewer via the partially reflective surface when the switching mirror and the second display are deactivated, and in a second mode, reflecting the second image toward a viewer via the switching mirror when the switching mirror and the second display are activated, and the first display is deactivated,
   selectively switching between the first and second modes based on ambient light conditions.

* * * * *